United States Patent [19]

Hori et al.

[11] Patent Number: 4,519,923
[45] Date of Patent: May 28, 1985

[54] FLUID COMPOSITION FOR DRILLING

[75] Inventors: Yuji Hori, Otsu; Yoshichika Nishimura; Fuminobu Takahashi, both of Kyoto, all of Japan

[73] Assignee: Dai-Ichi Kogyo Seiyaku Co., Ltd., Kyoto, Japan

[21] Appl. No.: 596,223

[22] Filed: Apr. 3, 1984

[30] Foreign Application Priority Data

Apr. 6, 1983 [JP] Japan .................. 58-60392
Apr. 19, 1983 [JP] Japan .................. 58-69810
Oct. 14, 1983 [JP] Japan .................. 58-193210

[51] Int. Cl.$^3$ .............................. C09K 7/02
[52] U.S. Cl. ........................ 252/8.5 C; 252/8.5 A
[58] Field of Search ............ 252/8.5 A, 8.5 C, 8.55 R

[56] References Cited
U.S. PATENT DOCUMENTS 4,425,241  1/1983  Swanson ................. 252/8.5 C
4,427,556  1/1984  House et al. ............ 252/8.5 C Primary Examiner—Ben R. Padgett
Assistant Examiner—T. J. Wallen
Attorney, Agent, or Firm—Armstrong, Nikaido, Marmelstein & Kubovcik

[57] ABSTRACT

A fluid composition suitable for use in drilling containing a sulfoethylcellulose alkali metal salt of which a degree of substitution is from 0.5 to 2.5 and the viscosity of a 1% by weight aqueous solution is 5 to 5,000 cP. The sulfoethylcellulose alkali metal salt has excellent water loss reducing ability and viscosity building ability and is soluble and stable in the presence of any monovalent and polyvalent salts at a wide pH range, and is applicable as a high molecular additive to a drilling mud and a completion fluid.

10 Claims, 6 Drawing Figures

FLUID COMPOSITION FOR DRILLING

BACKGROUND OF THE INVENTION

The present invention relates to a fluid for drilling, and more particularly to a drilling fluid containing an alkali metal salt of sulfoethylcellulose.

In oil well drilling. it is desired that (1) formation cuttings dug up with drilling the ground by a drill bit is removed away and the drill bit is cooled, and (2) a lubricating action is imparted to a drill stem. A drilling fluid having these functions is passed down through a drill pipe, jetted out from a nozzle of the bit and returned to the ground surface through an annular portion. Most of the drilling fluids are usually called mud, and are dispersions of clay particles swollen by hydration.

A clay-based fluid containing bentonite, attapulgite, water loss reducing agent, weighting materials, lost circulation materials and others, namely a mud used in drilling serves as a lubricant for the drill stem as a carrier for carrying formation cuttings and other solid materials such as a weighting material from the bottom hole to the ground surface and as a coolant for the drill bit, and also forms a filter cake on the well wall, whereby preventing the oil well from collapse. In order to effectively exhibit these important functions, the mud is required to always have properties such as an ability of reducing water loss an adequate viscosity and a thixotropic property. A water loss reducing agent is used for reducing the water loss of the mud. In general, it is employed in an amount of 1 to 3 pounds per barrel. It is desired that the water loss is not more than 10 ml. when the water loss reducing agent is used in such an amount. The smaller the water loss, the better. Sodium carboxymethylcellulose (hereinafter referred to as "Na-CMC") has been widely employed as a water loss reducing agent to be included in the mud. In that case, water containing mostly monovalent salts is used for forming the mud. In case of the sea water type mud, it is possible to impart the salt stability to the mud by merely raising the degree of substitution of Na-CMC. However, in recent years, the oil well is being deeper, and it is required to drill a place containing a large amount of polyvalent metal salts such as $CaCl_2$, $CaSO_4$ and $MgCl_2$ in an underground layer. Also, since a mud effective for drilling through heaving shale contains $Ca(OH)_2$, $CaCl_2$ and so on in saturation, conventionally used Na-CMC is not expected to be an effective water loss reducing agent for such a mud. This is the same even if the amount of Na-CMC is increased. Accordingly, there has been desired a water-soluble water loss reducing agent, as a mud additive, being stable and capable of exhibiting an excellent water loss reducing ability even in the presence of large amounts of polyvalent metal salts.

A clay-based drilling fluid has also a function of preventing a high pressure layer from blowing out a gas in addition to a function of cooling the drill bit and a function of carrying formation cuttings, since the various properties of the drilling fluid are largely developed by the colloidal properties such as gel strength and specific gravity of the mud. A weighting material such as barite is usually employed for raising the specific gravity of the clay-based fluid. Insoluble substances such as clay and barite included in the mud form a filter cake on the well wall during drilling down the ground. The formation of filter cake is very important from the viewpoint of well collapse prevention till reaching a producing zone such as an oil reservoir. However, after the bit reaches the producing zone, the formation of filter cake causes a serious problem, since the surface of the producing zone is covered by the filter cake, thus resulting in reduction of a permeability in the producing zone that may be said to be permanent. The clay and barite particles constituting the filter cake can be removed by conducting acid treatment at times, but often such a well damage cannot be restored even by such an expensive acid treatment, since clay and barite are low in solubility to acids. Therefore, it is necessary for preventing reduction in permeability to use a clear fluid having a specific gravity as high as sufficiently resisting the formation pressure instead of the clay-based fluid. Such a fluid is called a completion fluid. Similarly, it is desirable that a work over fluid does not cause a formation damage, since a permeable producing zone contacts the work over fluid.

An aqueous salt solution having a high specific gravity such as a saturated aqueous solution of $CaCl_2$ has been usually employed as a completion fluid. This fluid does not cause a formation damage. The highest specific gravity of the aqueous $CaCl_2$, solution is 1.38 g/cm$^3$ (11.5 pounds/gallon). However, it is not a completion fluid satisfactory for all well drilling operations. In case of using a combination of $CaBr_2$ and $CaCl_2$, it is possible to obtain an aqueous solution having a specific gravity of 1.81 g/cm$^2$ (15.1 pounds/gallon). Also, mixing of an aqueous solution of $CaCl_2$ and other aqueous solutions having a high specific gravity, e.g. aqueous solutions of metal salts such as $ZnBr_2$, $PbBr_2$ and $ZnCl_2$, is proposed to obtain fluids having a high specific gravity. Water-insoluble substances such as $CaCO_3$ may be added to aqueous salt solutions for the purpose of further raising the specific gravity of the solutions and for the purpose of minimizing invasion of completion fluids into a permeable formation and fractures at the time of gun-perforation. $CaCO_3$ is often used, since it is easily soluble in acids and also particles having various particle sizes are available.

It is necessary to add polymers to such completion fluids as a viscosifier, as a water loss reducing agent and as an agent for improving a carrying capacity. The polymers also serve as dispersants for $CaCO_3$. They are usually employed in an amount of 0.3 to 1.5 % by weight based on the volume of a completion fluid. Polymers conventionally used for this purpose are, for instance, (1) hydroxyethylcellulose (HEC), (2) carboxymethylcellulose (CMC), (3) polyacrylonitrile, (4) xanthan gum, and (5) guar gum. In particular, HEC is widely employed. However, these high molecular additives have drawbacks. That is to say, HEC causes foaming when dissolved with agitation. CMC and polyacrylonitrile are not soluble in acids. Xanthan gum contains about 50 % of a substance insoluble in acids. Also, xanthan gum and guar gum are deteriorative to enzymes. In particular, foaming resulting from HEC is fatal for use in drilling fluids, since not only corrosion owing to oxygen occurs, but also the apparent specific gravity of fluids is lowered. Further, since foaming is of an extent such that it is not avoided by addition of antifoaming agents, the cost for the antifoaming agents cannot be disregarded. In case of certain kinds of inorganic cations included in completion fluids, polymers form insoluble materials with the cations and precipitate. Accordingly, there has also been desired a high molecular additive for completion fluids having excellent viscosity building ability, water loss reducing ability, carrying capacity and ability of dispersing water-insoluble substances such as CaCO3, and being stable in a wide pH range and scarcely toxic, and not causing formation damage.

It is an object of the present invention to provide a high molecular additive suitable for use in drilling fluid containing at least one of monovalent and polyvalent metal salts.

A further object of the invention is to provide a drilling mud having a low water loss.

A still further object of the invention is to provide a drilling mud showing a low water loss, a stable viscosity and a stable thixotropic property in a wide pH range.

Another object of the invention is to provide a completion fluid which has a sufficient viscosity, a low water loss, excellent carrying capacity and dispersing ability, and is stable in a wide pH range and does not cause formation damage.

These and other objects of the present invention will become apparent from the description hereinafter.

SUMMARY OF THE INVENTION

It has now been found that alkali metal salts of sulfoethylcellulose having a degree of substitution of 0.5 to 2.5 and showing a viscosity of 5 to 5,000 cP (1 % aqueous solution) are very useful as additives for drilling fluid containing at least one of monovalent and polyvalent salts.

The sulfoethylcellulose alkali metal salts have an excellent ability of reducing the water loss. Accordingly, they are useful as water loss reducing agents for drilling mud, particularly for drilling mud containing monovalent and/or polyvalent salts. Also, the water loss reducing ability of the sulfoethylcellulose alkali metal salts is synergistically improved by the combination use thereof with polyethylene glycol having an average molecular weight of 1,000 to 1.000,000.

The sulfoethylcellulose alkali metal salts are also useful as high molecular additives for a completion fluid containing monovalent and/or polyvalent salts, and stably exhibit excellent viscosity building ability, water loss reducing ability and dispersing ability in a wide pH range without foaming and producing insoluble materials.

Thus, in accordance with the present invention, there is provided a fluid composition for drilling comprising:
(a) a drilling fluid containing at least one of monovalent and polyvalent salts, and
(b) an alkali metal salt of sulfoethylcellulose which has a degree of substitution of 0.5 to 2.5 and of which a 1 % by weight aqueous solution has a viscosity of 5 to 5,000 cP.

DETAILED DESCRIPTION

Figure 1:
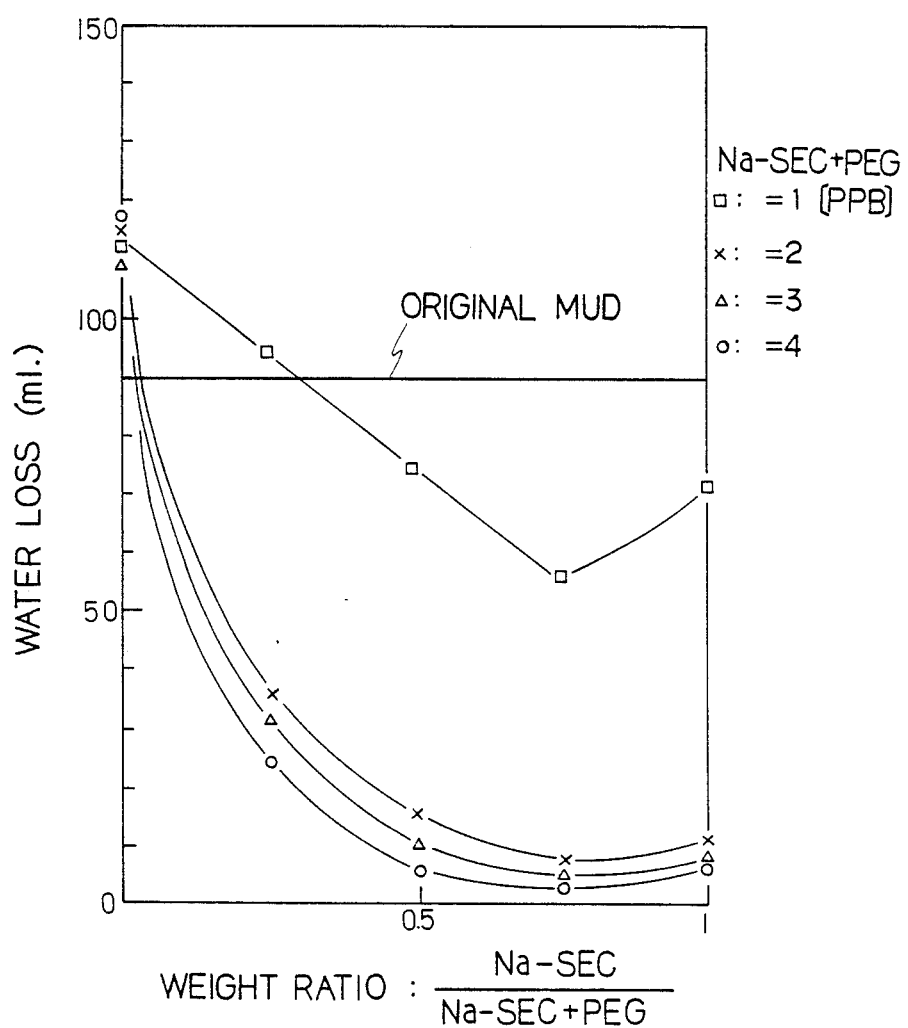
FIG. 1 is a graph showing the results of a filtration test of mud containing metal salts (MgCl2, CaCl2 and NaCl) to which sulfoethylcellulose sodium salt and polyethylene glycol are added in various ratios.

The recurring unit of the sulfoethylcellulose alkali metal salts used in the present invention is represented by the following structural formula (provided that the degree of substitution is 1):

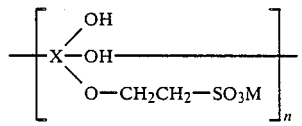

wherein X is a glucose residue ($C_6H_7O_2$), n is an integer and M is an alkali metal.

The term "degree of substitution" as used herein means an average degree of substitution, in other words, the average number of substituent groups, per unit glucose. The degree of substitution must be sufficient to render the molecule soluble in water. In the present invention, it is particularly preferable that the degree of substitution is from 0.5 to 2.5. When the degree of substitution is less than 0.5, the water solubility is poor and the effects of the invention are not sufficiently exhibited. The sulfoethylcellulose alkali metal salts having a degree of substitution of more than 2.5 are difficult to produce on an industrial scale for the technical and economical reasons.

Although the viscosity of the sulfoethylcellulose alkali metal salts dissolved in water is not particularly limited, the objects of the invention can be sufficiently attained when the viscosity of a 1 % by weight aqueous solution thereof is from 5 to 5,000 cP. From the viewpoint of the viscosity building ability in a completion fluid, it is preferable that the viscosity of the 1 % by weight aqueous solution is at least 100 cP. In mud of a high salt concentration, the degree of substitution has a larger influence on the water loss reducing ability rather than the viscosity.

The sulfoethylcellulose alkali metal salts are added as water loss reducing agents to a drilling mud. The mud contains clay particles in an amount effective for drilling, usually in an amount of 2 to 100 % by weight based on water, provided that formation cuttings and barite are not included in the above clay particles. Any known clays for use in drilling can be employed in the present invention, e.g. bentonite, attapulgite and sepiolite clay. The content of the sulfoethylcellulose alkali metal salts in the mud composition is not particularly limited, but is usually selected from 0.1 to 1.5 wt/v %. The mud of the invention may contain a conventional water loss reducing agent.

Examples of the monovalent salts included in the drilling mud are, for instance, NaCl, KCl, LiCl and $NH_4Cl$ as $Na^+$, $K^+$, $Li^+$ and $NH_4^+$ sources. The polyvalent salts included in the drilling mud are not limited by their solubility in water, and the mud may contain polyvalent salts of an amount over the solubility in the form of solids. $Ca^{2+}$ sources include, for instance, calcium chloride ($CaCl_2$), calcium sulfate ($CaSO_4$), calcium acetate [$Ca(CH_3COO)_2$], calcium formate [$Ca(CHO_2)_2$], calcium nitrate [$Ca(NO_3)_2$] and calcium gluconate [$Ca(CH_2OH(CHOH)_4COO)_2$]. $Mg^{2+}$ sources include, for instance, $MgCl_2$, $MgSO_4$, $Mg(CH_3COO)_2$, $Mg(CHO_2)_2$, $Mg(NO_3)_2$ and $Mg[CH_2OH(CHOH)_4COO]_2$. $Ba^{2+}$ sources include, for instance, $BaCl_2$, $Ba(OH)_2$ and $BaSO_4$. $Zn^{2+}$ sources include, for instance, $ZnCl_2$, $Zn(OH)_2$ and $ZnSO_4$. $Al^{3+}$ sources include, for instance, $AlCl_3.6H_2O$, $Al(OH)_3$, $Al_2(SO_4)_3$ and $Al(CH_3COO)_3$. $Fe^{3+}$ sources include, for instance, $FeCl_3.6H_2O$, $Fe(OH)_3$, $Fe_2(SO_4)_3$ and $Fe(NO_3)_3$. $Cr^{3+}$ sources include, for instance, $Cr(NO_3)_3$, $Cr(CH_3COO)_3$, $CrBr_3$, $CrCl_3$, $Cr(OH)(NO_3)_2$ and $Cr(OH)_2(NO_3)$. The polyvalent salts contained in the mud are not limited to the above exemplified salts. The mud can contain monovalent and/or polyvalent salts in saturation or more. A part of the salts can be present in the form of solid in the mud. Even if the mud does not contain or contains only a slight amount of the salts, it is effective for drilling the ground containing a large amount of metal salts such as $CaCl_2$ and the sulfoethylcellulose alkali metal salts can exhibit an excellent water reducing ability.

The water loss reducing ability of the sulfoethylcellulose alkali metal salts is synergistically improved by using them in combination with polyethylene glycol. It is preferable that the average molecular weight of polyethylene glycol is from 1,000 to 1,000,000. When the average molecular weight is less than 1,000, the water loss reducing ability is not sufficiently improved. Also, polyethylene glycol having an average molecular weight of more than 1,000,000 is low in solubility in water, and accordingly the improvement is not much expected. The mixing ratio of polyethylene glycol to the sulfoethylcellulose alkali metal salt is from 5:95 to 75:25 by weight, preferably 10:90 to 50:50 by weight.

When the sulfoethylcellulose alkali metal salts are employed as water loss reducing agents in a drilling mud, the following effects are produced.

1. They exhibit a very excellent water loss reducing ability even in a mud containing polyvalent salts in a high concentration of more than 10,000 p.p.m.
2. They exhibit a very excellent water loss reducing ability even in a mud containing both of monovalent salts and polyvalent salts in high concentrations of more than 10,000 p.p.m.
3. The filter cake formed by the mud composition of the invention is thin and moreover tough, and accordingly collapse of the oil well wall can be prevented.
4. The mud composition of the invention is low in initial gel strength and gas bubbles are promptly released out of the mud. Therefore, gas cut of the mud does not occur, that is to say, blowout can be prevented.
5. The use of the sulfoethylcellulose alkali metal salts in combination with polyethylene glycol produces a very excellent effect on reduction of water loss in mud containing polyvalent salts in high concentrations.

The sulfoethylcellulose alkali metal salts are also effective for a completion fluid or a brine fluid which is an aqueous solution or dispersion containing salts and water-soluble high molecular additives. The amount of the sulfoethylcellulose alkali metal salts is usually from 0.1 to 3.0 by weight, preferably 0.3 to 1.5 % by weight based on the volume of the completion fluid. The completion fluid of the invention may contain polymers conventionally employed as high molecular additives.

General inorganic salts included in the completion fluids are $NaCl$, $KCl$, $CaCl_2$, $CaBr_2$, $ZnBr_2$ and $PbBr_2$, but there is a case where other salts are preferred from the economical point of view due to acquisition condition or depending on the specific gravity required for the completion fluid. In that case, attention should be paid to the specific gravity and crystallization temperature. Examples of the other salts are, for instance, $LiCl$, $NH_4Cl$, $NH_4NO_3$, $(NH_4)_2SO_4$, $Na_2CO_3$, $NaCr_2O_7.2H_2O$, $NaBO_2$, $NaNO_3$, $NaBO_3$, $Na_2SO_4$, $Na_2SO_3.7H_2O$, $Na_2S_2O_3.5H_2O$, $Na_2HPO_4.12H_2O$, $K_4Fe(CN)_6.3H_2O$, $CaSO_4$, $CaBr_2$, $Ca(CH_3COO)_2$, $Ca(CHO_2)_2$, $Ca(NO_3)_2$, $Ca[CH_2OH(CHOH)_4COO]_2$, $MgCl_2$, $MgSO_4$, $Mg(CH_3COO)_2$, $Mg(CHO_2)_2$, $Mg(NO_3)_2$, $Mg[CH_2OH(CHOH)_4COO)_2$, $BaCl_2$, $Ba(OH)_2$, $BaSO_4$, $ZnCl_2$, $Zn(NO_3)_2$, $Zn(OH)_2$, $ZnSO_4$, $ZnBr_2$, $AlCl_3.6H_2O$, $Al(OH)_3$, $Al_2(SO_4)_3$, $Al(CH_3COO)_3$, $FeCl_3.6H_2O$, $Fe(OH)_3$, $Fe_2(SO_4)_3$, $Fe(NO_3)_3$, $Cr(NO_3)_3$, $Cr(CH_3COO)_3$, $CrBr_3$, $CrCl_3$, $Cr(OH)(NO_3)_2$, $Cr(OH)_2(NO_3)$, $SnCl_4$, $AgNO_3$, $FeCl_2$ and the like. The salts used in the present invention are not limited to the above salts. The amount of the salts is not restricted by the solubility thereof. In case that a counterplan to minimize the formation damage has been considered, the completion fluid may contain salts such as $CaCO_3$ in the form of solid. The content of the salts in the completion fluid is determined according to desired specific gravity. The completion fluid can contain the salts in an amount of 1 % by weight to saturation.

The largest feature of the sulfoethylcellulose alkali metal salts is that the viscosity building ability, water loss reducing ability and an ability of dispersing solid salts and clay are stable without being impaired even in the presence of monovalent, bivalent or trivalent cations and even in a pH range of 1 to 13. Also, the sulfoethylcellulose alkali metal salts have no foaming property, whereas hydroxyethylcellulose generally employed hitherto has a large foaming problem. In this respect, too, sulfoethylcellulose alkali metal salts have an excellent property suited for use in completion fluids which have a high specific gravity. Further, the sulfoethylcellulose alkali metal salts are nontoxic to human body and easy to handle. Therefore, there is no danger of environmental pollution.

The use of the sulfoethylcellulose alkali metal salts in completion fluids has the following advantages.

1. They show a very excellent viscosity building ability without forming insoluble material even in a completion fluid containing at least one of monovalent and polyvalent salts in concentrations of from 10,000 p.p.m. to saturation.
2. They show a very excellent water loss reducing ability in the above-mentioned fluid system.
3. They act as excellent dispersants.
4. They do not cause foaming in the above-mentioned fluid system, and accordingly they are very advantageous in operations such as fluid preparation and also it is not necessary to use antifoaming agents.
5. The viscosity lowering of the fluid is a little in a wide pH range (pH 1 to 13), that is to say, the fluid is stable to pH change.
6. They scarcely deteriorate by enzymes in the above-mentioned fluid system, unlike xanthan gum and guar gum.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

In the Examples, the apparent viscosity of a mud was measured by employing a Fann VG meter made by Fann Instrument Corp., Houston, Tex., U.S.A. Also, a mud test was made according to the method provided by American Petroleum Institute (API).

EXAMPLE 1 AND COMPARATIVE EXAMPLE 1

To 100 parts of deionized water were added 18.0 parts of bentonite produced in U.S.A. (commercially available under the commercial name "Aquagel" made by Baroid Co., U.S.A.) and 4.00 parts of $Ca(OH)_2$. To 350 ml. of the obtained mud was added sulfoethylcellulose sodium salt (hereinafter referred to as "Na-SEC") in a proportion of 1 or 2 pounds per barrel of the mud (hereinafter referred to as "PPB"). The properties of the obtained mud were measured.

For comparison, the above procedure was repeated except that carboxymethylcellulose sodium salt (hereinafter referred to as "Na-CMC") (degree of substitution: 1.07, viscosity of 1 % aqueous solution: 3,050 cP) conventionally employed as a salt stable water loss reducing agent in sea water mud was employed instead of Na-SEC.

The results are shown in Table 1 with the results for the original mud to which no water loss reducing agent was added. The pH of the muds were more than 12.

Na-SEC shown in Table 1 have the following characteristics.

Na-SEC(1): degree of substitution 0.83, viscosity of 1 % aqueous solution 93 cP
Na-SEC(2): degree of substitution 1.10, viscosity of 1 % aqueous solution 357 cP
Na-SEC(3): degree of substitution 0.38, viscosity of 1 % aqueous solution 223 cP.

As understood from Table 1, the conventional Na-CMC water loss reducing agent cannot exhibit the water loss reducing ability in mud containing $Ca^{2+}$ in high concentrations. On the ohter hand, Na-SEC(1) and Na-SEC(2) exhibit a very excellent water loss reducing ability with increasing the amount of use. For instance, the water loss of the mud to which 2.00 PPB of Na-SEC(1) was added is 1/20 that of the original mud and 1/12 that of the mud to which 2.00 PPB of Na-CMC was added.

Also, it is observed that the thickness of the filter cake is thin as compared with the original mud and the mud containing Na-CMC. This result shows that a thin and tough filter cake is formed, and accordingly, from this point of view, it would also be understood that the mud of the present invention exhibits an excellent effect in a mud of high $Ca^{2+}$ concentration.

However, Na-SEC(3) having a low degree of substitution which is outside the specified range is inferior in gel strength, water loss and thickness of filter cake, and the effects required as a water loss reducing agent are insufficient.

EXAMPLE 2 AND COMPARATIVE EXAMPLE 2

To 350 ml. of a mud having the composition shown in Table 2 was added 2.00 PPB of a water loss reducing agent shown in Table 3, and the properties of the obtained muds were measured.

The results are shown in Table 3.

TABLE 2

| Components | Amount (part) |
| --- | --- |
| $H_2O$ | 100 |
| $MgCl_2$ | 3.0 |
| $CaCl_2$ | 8.0 |
| NaCl | 30.5 |
| Salt Gel*[1] (attapulgite clay) | 4.3 |
| Premium Gel*[2] (bentonite) | 2.9 |
| Formation cuttings | 11.4 |

(Notes)
*[1]Product of Magcobar Co., U.S.A.
*[2]Product of Am. Colloid Co., U.S.A.

TABLE 1

| | Water loss reducing agent | | Apparent viscosity | Gel strength | Water loss | Thickness of filter cake |
| --- | --- | --- | --- | --- | --- | --- |
| | Kind | Amount (PPB) | (cp) | (lb/100 ft$^2$) | (ml) | (mm) |
| Original mud | — | — | 65.5 | 30 | 150 | 30> |
| Com. Ex. 1 (a) | Na—CMC | 1.00 | 60.3 | 30 | 123 | 30> |
| (b) | Na—CMC | 2.00 | 101.0 | 44 | 86 | 30> |
| (c) | Na—SEC(3) | 1.00 | 64.8 | 28 | 140 | 30> |
| (d) | Na—SEC(3) | 2.00 | 65.3 | 2.5 | 70 | 24.5 |
| Ex. 1 (a) | Na—SEC(1) | 1.00 | 15.0 | 1.0 | 20.0 | 4.6 |
| (b) | Na—SEC(1) | 2.00 | 36.3 | 1.0 | 7.4 | 2.0 |
| (c) | Na—SEC(2) | 1.00 | 63.8 | 5.5 | 10.0 | 2.7 |

TABLE 3

| | Water loss reducing agent | | | Apparent viscosity | Gel strength | Water loss | Thickness of filter cake (mm) |
| --- | --- | --- | --- | --- | --- | --- | --- |
| | Kind | Degree of substitution | Viscosity of 1% aqueous soln. (cP) | (cP) | (lb/100 ft$^2$) | (ml) | |
| Original mud | — | — | — | 9.8 | 5.0 | 89.7 | 6.7 |
| Com. Ex. 2 (a) | Na—CMC | 0.59 | 4,200 | 19.5 | 12.5 | 80.5 | 6.5 |
| (b) | Na—CMC | 0.91 | 4,100 | 11.0 | 5.0 | 86.0 | 6.7 |
| (c) | Na—CMC | 1.44 | 740 | 10.0 | 4.5 | 94.5 | 6.6 |
| (d) | Na—SEC | 0.45 | 77 | 12.5 | 7.0 | 90.5 | 6.7 |
| Ex. 2 (a) | Na—SEC | 0.55 | 4,800 | 120.0 | 2.5 | 15.0 | 2.0 |
| (b) | Na—SEC | 1.20 | 6 | 10.0 | 0.5 | 7.5 | 1.7 |

TABLE 3-continued

|  | Water loss reducing agent | | Apparent viscosity (cP) | Gel strength (lb/100 ft$^2$) | Water loss (ml) | Thickness of filter cake (mm) |
| --- | --- | --- | --- | --- | --- | --- |
| Kind | Degree of substitution | Viscosity of 1% aqueous soln. (cP) | | | | |
| (c) Na—SEC | 2.10 | 500 | 45.0 | 1.5 | 5.4 | 1.3 |

As is clear from Table 3, a conventional Ma-CMC water loss reducing agent and Na-SEC having a low degree of substitution are not expected to exhibit the water loss reducing ability in mud containing polyvalent salts and monovalent salts in high concentrations.

On the other hand, Na-SEC of the present invention exhibits a very excellent water loss reducing ability. Therefore, it would be understood that the mud compositions of the present invention can exhibit excellent effects even in the presence of high concentrations of various salts.

In addition that Na-SEC of the invention is an excellent water loss reducing agent, the gel strength is low as compared with the original mud or the mud containing Na-CMC or Na-SEC having a low degree of substitution. Therefore, Na-SEC of the invention provides a mud excellent also in that gas cut of mud does not occur.

Also, from the viewpoint of the amount of use, it would be understood that Na-SEC of the invention is very excellent in practical use, since the water loss of the original mud is decreased to 1/10, in other words, less than 10 ml. by the use in an amount of 2 PPB.

EXAMPLE 3 AND COMPARATIVE EXAMPLE 3

To 100 parts of deionized water were added 6.0 parts of Aquagel (bentonite produced in U.S.A.) and 5.0 parts of AlCL$_3$. To 350 ml. of the obtained mud was added Na-SEC (degree of substitution: 1.06, viscosity of 1 % aqueous solution: 121 cP) or Na-CMC (degree of substitution: 1.07, viscosity of 1 % aqueous solution: 3,060 cP) in an amount of 1.00 PPB, 2.00 PPB or 4.00 PPB. The properties of the muds were measured.

The results are shown in Table 4 together with the results for the original mud (pH 2.2).

As is clear from Table 4, a conventional Na-CMC water loss reducing agent has no water loss reducing ability in a high AL$^{3+}$ containing mud.

On the other hand, Na-SEC of the invention exhibits a very excellent water reducing ability with a slight amount. For instance, the water loss of the mud is ⅛ that of the original mud when the amount of use is 1 PPB, and the water loss is 1/19 that of the original mud when the amount is 2 PPB.

Also, as observed in Examples 1 and 2, the Na-SEC containing mud of this Example forms a thin and tough filter cake. This is another feature of the present invention.

From the results for the strongly alkaline mud (pH>12) in Example 1 and the results for the strongly acidic mud (pH<2.5) in this Example, it is also clear that Na-SEC in the invention is usable in a wide pH range.

EXAMPLE 4 AND COMPARATIVE EXAMPLE 4

To 350 ml. of a mud (pH 0.8) having the composition shown in Table 5 was added 1.00 PPB, 2.00 PPB or 4.00 PPB of Na-SEC (degree of substitution: 1.30, viscosity of 1 % aqueous solution: 1,000 cP) or Na-CMC (degree of substitution: 2.10, viscosity of 1 % aqueous solution: 500 cP).

The results are shown in Table 6.

TABLE 5

| Components | Amount (part) |
| --- | --- |
| H$_2$O | 100 |
| NaCl | 5.0 |
| ZnBr$_2$ | 5.0 |
| Fe(NO$_3$)$_3$ | 5.0 |
| Aquagel (bentonite) | 6.0 |

TABLE 4

|  | Water loss reducing agent | | Apparent viscosity (cp) | Gel strength (lb/100 ft$^2$) | Water loss (ml) | Thickness of filter cake (mm) |
| --- | --- | --- | --- | --- | --- | --- |
| | Kind | Amount (PPB) | | | | |
| Original mud | — | — | 2.3 | 0.5 | 113.4 | 4.8 |
| Com. Ex. 3 (a) | Na—CMC | 1.00 | 2.0 | 0.0 | 119.4 | 4.7 |
| (b) | Na—CMC | 2.00 | 2.0 | 0.5 | 120.3 | 4.6 |
| Ex. 3 (a) | Na—SEC | 1.00 | 4.8 | 0.5 | 14.1 | 1.5 |
| (b) | Na—SEC | 2.00 | 14.3 | 0.5 | 6.0 | 1.0 |
| (c) | Na—SEC | 4.00 | 39.8 | 1.5 | 3.8 | 0.57 |

TABLE 6

|  | Water loss reducing agent | | Apparent viscosity (cp) | Gel strength (lb/100 ft$^2$) | Water loss (ml) | Thickness of filter cake (mm) |
| --- | --- | --- | --- | --- | --- | --- |
| | Kind | Amount (PPB) | | | | |
| Original mud | — | — | 2.3 | 0.5 | 99.0 | 3.4 |
| Com. Ex. 4 (a) | Na—CMC | 2.00 | 2.3 | 0.5 | 92.0 | 3.2 |
| (b) | Na—CMC | 4.00 | 2.3 | 0.5 | 91.5 | 3.3 |
| Ex. 4 (a) | Na—SEC | 1.00 | 15.0 | 1.5 | 17.6 | 2.0 |
| (b) | Na—SEC | 2.00 | 35.0 | 1.5 | 6.9 | 1.7 |
| (c) | Na—SEC | 4.00 | 110.0 | 2.5 | 4.3 | 0.88 |

It is observed in Table 6 that the Na-SEC water loss reducing agent in the invention exhibits an excellent water loss reducing effect even with the use of a slight amount in a mud system in which monovalent, bivalent and trivalent salts coexist in high concentrations, whereas a conventional Na-CMC water loss reducing agent has little water loss reducing ability in the mud system. The water loss of the original mud can be decreased to 1/6 by the use of Na-SEC in an amount of 1 PPB and decreased to 1/14 by the use in an amount of 2 PPB. Also, the filter cake formed by the mud of the invention is thin and tough. Further, the mud of the invention is effective in a wide pH range, as understood from the results for the strongly alkaline mud (pH>2) of Example 1 and the results for the strongly acidic mud (pH<1.0) of this Example. As understood from the above results, it is also one of the features that Na-SEC has a high viscosity building ability.

EXAMPLE 5

Na-SEC (degree of substitution: 0.83, viscosity of 1 % aqueous solution: 93 cP) was admixed with polyethylene glycol (hereinafter referred to as "PEG") having an average molecular weight of 6,000 in various mixing ratios.

Each of the obtained mixtures of Na-SEC and PEG was dissolved in the original mud having the composition shown in Table 2 in an amount of 1, 2, 3 or 4 PPB. The obtained muds were subjected to a filtration test according to the mud testing method provided by API to determine the water loss.

The results are shown in FIG. 1 wherein the axis of abscissas is the weight proportion of Na-SEC in the mixture of Na-SEC and PEG and the axis of ordinates is the water loss (ml).

As is clear from FIG. 1, the minimum value appears in water loss when Na-SEC is used in combination with PEG. The water loss becomes minimum in the vicinity of the Na-SEC/PEG mixing ratio=3/1 by weight. That is to say, the water loss reducing ability is increased as compared with the single use of Na-SEC or the single use of PEG. This tendency is observed with respect to all amounts of use from 1 to 4 PPB.

Further, it is observed in FIG. 1 that when mixing ratio of Na-SEC to PEG is 1:1 by weight, the water loss is approximately equal to the water loss for the single use of Na-SEC, and the water loss suddenly increases with decreasing the proportion of Na-SEC or increasing the proportion of PEG, and in case that the amount of the mixture of Na-SEC and PEG is 1 PPB, the water loss becomes approximately equal to that of the orginal mud when the Na-SEC/PEG ratio is ⅓ by weight.

From the above results, it would be understood that the content of PEG in the mixture of SEC alkali metal salt and PEG is at most 75 %, preferably 5 to 75, more preferably 10 to 50 %.

It is also understood from FIG. 1 that not only the mixture of Na-SEC and PEG used in an amount of 1 to 4 PPB shows the minimum value in water loss, but also the water loss reducing ability of Na-SEC can be improved by dissolving PEG in a mud containing Na-SEC. For instance, when 2 PPB of PEG is added to a mud containing 2 PPB of Na-SEC of which water loss is 10.0 ml., the water loss of the composition is decreased to 5.0 ml.

EXAMPLE 6

To 350 ml. of a mud consisting of 100 parts of deionized water, 6.0 parts of Aquagel (bentonite produced in U.S.A.) and 4.0 parts of $Ca(OH)_2$ was added a mixture of Na-SEC (degree of substitution: 2.20, viscosity of 1 % aqueous solution: 390 cP) and PEG (average molecular weight: 6,000) in varied ratios in an amount of 2 PPB. The filtration test of the obtained muds was made in the same manner as in Example 5.

Figure 2:
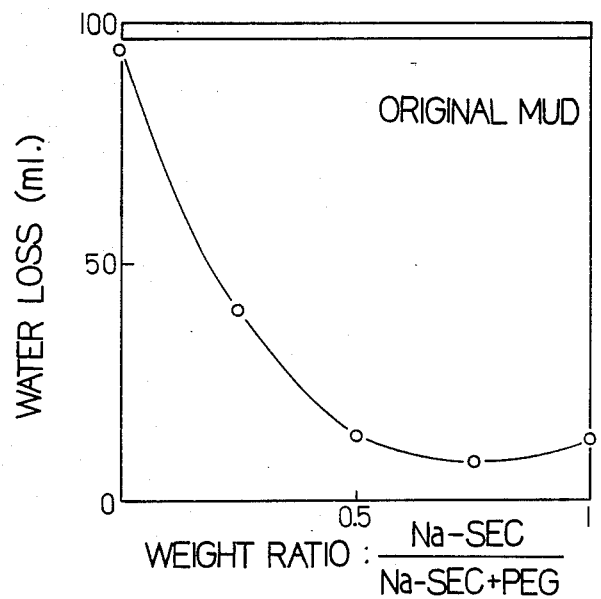
FIG. 2 is a graph showing the results of a filtration test of mud containing Ca(OH)2 to which sulfoethylcellulose sodium salt and polyethylene glycol are added in various ratios.

The results are shown in FIG. 2.

It is observed in FIG. 2 that with respect to mud system containing only a bivalent salt (calcium hydroxide), too, the minimum value of the water loss appears when a mixture of Na-SEC and PEG is added to the mud system. It would be understood that the water loss reducing ability of the SEC alkali metal salts is synergistically improved by using in combination with PEG, and that when the mixture of the SEC salt and PEG is used in an amount of 2 PPB, the proportion of PEG in the mixture of from 5 to 75 %, preferably 10 to 50 %, is practical.

EXAMPLE 7

The procedure of Example 6 was repeated except that $CaCl_2$ was employed instead of $Ca(OH)_2$.

Figure 3:
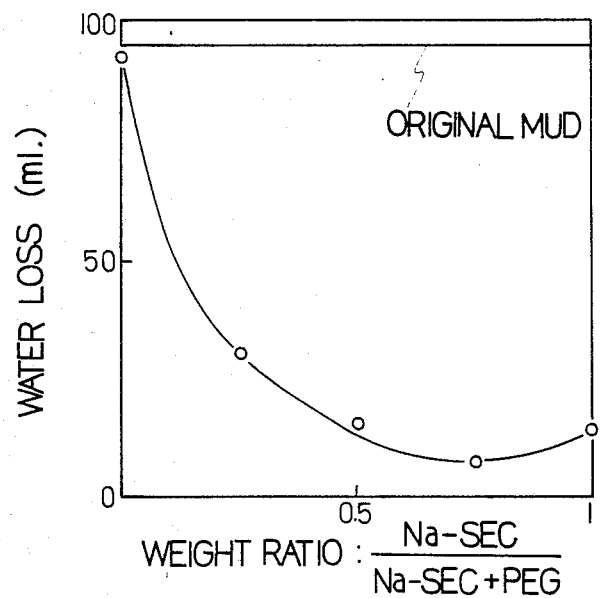
FIG. 3 is a graph showing the results of a filtration test of mud containing CaCl2 to which sulfoethylcellulose sodium salt and polyethylene glycol are added in various ratios.

The results are shown in FIG. 3.

It is observed in FIG. 3 that with respect to a mud system containing only a bivalent salt ($CaCl_2$), too, the minium value of the water loss appears when a mixture of Na-SEC and PEG is added to the mud system. It would be understood that the water loss reducing ability of the SEC salts is synergistically improved by using in combination with PEG, and that when the mixture of the SEC salt and PEG is used in an amount of 2 PPB, the proportion of PEG in the mixture of from 5 to 75 % preferably 10 to 50 %, is practical.

EXAMPLE 8 AND COMPARATIVE EXAMPLE 5

To 350 ml. of a mud consisting of 100 parts of deionized water, 6.0 parts of Aquagel (bentonite) and 5.0 parts of $AlCl_3$ was added a mixture of Na-SEC (degree of substitution: 0.60, viscosity of 1 % aqueous solution: 3,500 cP) and PEG (average molecular weight: 6.000) in varied ratios in an amount of 2 PPB. The mud test of the obtained muds was made.

The above procedures were repeated except that the above Na-SEC, Na-CMC (degree of substitution: 1.15, viscosity of 1 % aqueous solution: 2,000 cP) or PEG was used alone instead of the mixture of Na-SEC and PEG.

The results are shown in Table 7 together with the results for the original mud.

TABLE 7

|  | Water loss reducing agent (PPB) | | | Apparent viscosity (cP) | Gel strength (lb/100 ft$^2$) | water loss (ml) | Thickness of filter cake (mm) |
| --- | --- | --- | --- | --- | --- | --- | --- |
|  | Na—SEC | Na—CMC | PEG |  |  |  |  |
| Original mud | — | — | — | 2.3 | 0.5 | 113.4 | 4.8 |
| Com. Ex. 5 (a) | — | 2.00 | — | 3.0 | 1.0 | 115.0 | 5.0 |
| (b) | — | — | 2.00 | 3.0 | 1.0 | 115.0 | 5.1 |
| Ex. 8 (a) | 2.00 | — | — | 62.0 | 2.5 | 25.0 | 1.5 |

TABLE 7-continued

| | Water loss reducing agent (PPB) | | | Apparent viscosity (cP) | Gel strength (lb/100 ft$^2$) | water loss (ml) | Thickness of filter cake (mm) |
|---|---|---|---|---|---|---|---|
| | Na—SEC | Na—CMC | PEG | | | | |
| (b) | 1.50 | — | 0.50 | 56.0 | 1.5 | 15.0 | 0.85 |
| (c) | 1.00 | — | 1.00 | 55.0 | 2.0 | 20.0 | 1.2 |
| (d) | 0.50 | — | 1.50 | 15.0 | 2.0 | 42.5 | 2.5 |

It is observed in Table 7 that also with respect to a mud system in which a trivalent metal cation (Al$^{3+}$) is present, the minimum value appears in water loss when a mixture of Na-SEC and PEG is added to the mud system. In other words, the water loss reducing ability of Na-SEC is improved by using in combination with PEG. Also, the gel strength is not so large as to cause a problem, and the filter cake is thin.

EXAMPLE 9

In each of 2 % and 10 % aqueous solutions of NaCl, KCl, CaCl$_2$, AlCl$_3$ or Al$_2$(SO$_4$)$_3$ was dissolved Na-SEC (degree of substitution: 0.90, viscosity of 1 % aqueous solution: 149 cP) in a concentration of 1 % (in the anhydrous state). The viscosity of the obtained aqueous solutions was measured by a Brookfield viscometer.

As comparison, the above procedure was repeated with respect to cellulose sulfate sodium salt (hereinafter referred to as "Na-CS") (degree of substitution: 0.87, viscosity of 1 % aqueous solution: 142 cP) and Na-CMC (degree of substitution: 1.07, viscosity of 1 % aqueous solution: 121 cP). The reason why Na-CS was used for comparison was that it is structurally similar to Na-SEC.

Figure 4:
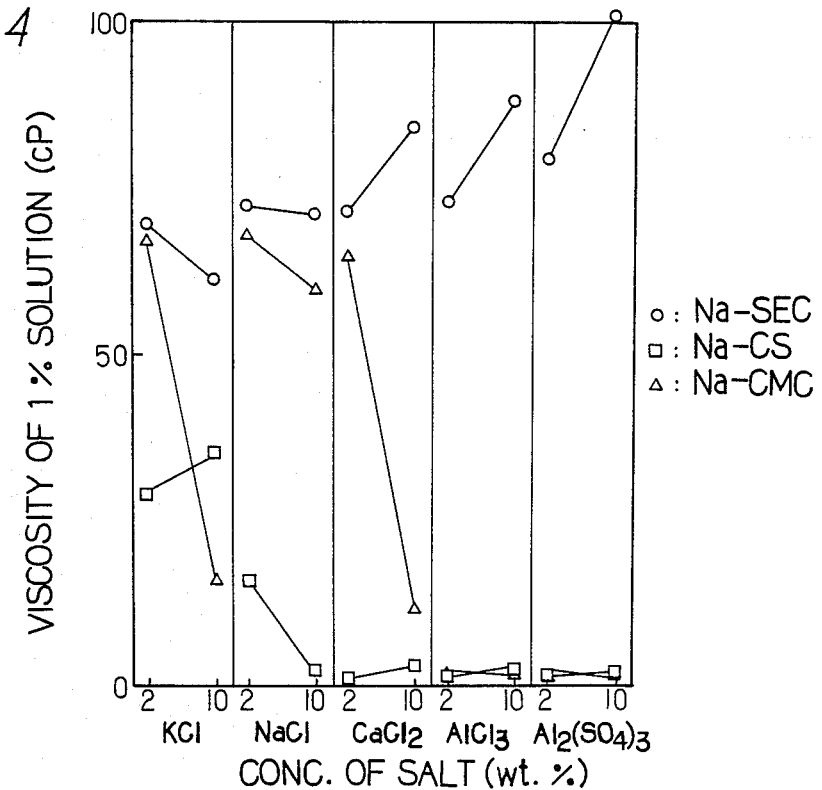
FIG. 4 is a graph showing the viscosities of aqueous solutions containing 2 or 10 % by weight of a metal salt and 1 % by weight of sodium salt of sulfoethylcellulose, cellulose sulfate or carboxymethylcellulose.

The results are shown in FIG. 4.

As clear from FIG. 4. in case that a monovalent cation such as Na$^+$ or K$^+$ is present, Na-CMC is completely dissolved, but the viscosity is lowered with increasing the salt concentration from 2 % to 10 %, and Na-CMC forms water-insoluble materials in the presence of Ca$^{2+}$ or Al$^{3+}$ and consequently the viscosity of the solution is very low. Also, Na-CS shows a remarkable lowering of viscosity due to formation of insoluble materials with respect to all aqueous solution systems.

On the other hand, Na-SEC of the invention does not form insoluble materials even in the presence of bivalent or trivalent cations and shows a good solubility. This fact indicates that the SEC alkali metal salts of the invention are excellent in stability to salts and moreover have an excellent viscosity building ability.

EXAMPLE 10

Aqueous solutions containing the inorganic salt shown in Table 8 in a concentration of from 5 % to saturation were prepared. To 10 ml. of each of the aqueous salt solutions was added 1 ml. of a 1 % aqueous solution of Na-SEC (degree of substitution: 2.45, viscosity of 1 % aqueous solution: 12 cP) with agitation, and the formation of water-insoluble material was observed to determine the compatibility of the aqueous solution of Na-SEC with the aqueous salt solutions.

As comparison, the above procedure was repeated with respect to HEC (molar substitution of ethylene oxide: 2.0, viscosity of 1 % aqueous solution: 10 cP) and carboxymethylhydroxyethylcellulose sodium salt (hereinafter referred to as "Na-CMHEC") (molar substitution of ethylene oxide: 2.0, degree of substitution for carboxymethyl group: 0.30, viscosity of 1 % aqueous solution: 15 cP).

The results are shown in Table 8 wherein the solubility of the polymer in an aqueous salt solution is shown according to the following criteria:
O: Solubility is very good.
Δ: An insoluble material is slightly formed.
X: An insoluble material is formed.

TABLE 8

| Concentration of salt (%) | HEC | | | | | Na—SEC | | | | | Na—CMHEC | | | | |
|---|---|---|---|---|---|---|---|---|---|---|---|---|---|---|---|
| | 5 | 10 | 20 | 40 | 60 | 5 | 10 | 20 | 40 | 60 | 5 | 10 | 20 | 40 | 60 |
| AgNO$_3$ | Δ | Δ | Δ | Δ | Δ | O | O | O | O | O | X | X | X | X | X |
| NaBO$_2$.2H$_2$O | O | O | X | X(S) | — | O | O | O | O(S) | — | O | O | X | X(S) | — |
| Na$_2$S$_2$O$_3$ | O | O | O | O | X | O | O | O | O | O | Δ | Δ | Δ | Δ | Δ |
| ZnSO$_4$ | O | O | O | X | X(S) | O | O | O | O | O(S) | Δ | Δ | Δ | Δ | Δ(S) |
| Al$_2$(SO$_4$)$_3$ | O | O | Δ | X(S) | — | O | O | O | O(S) | — | O | O | X(S) | — | — |
| Cr(NO$_3$)$_3$ | O | O | O | O | O | O | O | O | O | O | Δ | Δ | Δ | Δ | Δ |

(Note)
"S" shows a saturated aqueous solution of a salt.

As is clear from Table 8, although HEC is a polymer which has hitherto been widely employed in completion fluids for drilling, it forms an insoluble material depending on the kind and concentration of inorganic salts and accordingly the uses are restricted. The same may be said of Na-CMHEC. On the other hand, Na-SEC of the invention does not form an insoluble material with at least all inorganic salts (monovalent, bivalent and trivalent cations) shown in Table 8. This result shows that Na-SEC in the invention has an excellent stability to salts.

EXAMPLE 11

The pH of a 1 % aqueous solution of the following polymer was variously changed with H$_2$SO$_4$ or NaOH, and the viscosity was measured at 25.0°±0.5° C. by a Brookfield viscometer to observe the lowering of the viscosity due to pH change.
Na-SEC of the invention: degree of substitution 0.55, viscosity of 1 % aqueous solution 1,130 cP
Na-CS as comparison: degree of substitution 0.53, viscosity of 1 % aqueous solution 1,115 cP
Na-CMC as comparison: degree of substitution 0.55, viscosity of 1 % aqueous solution 1,080 cP The results are shown in FIG. 5.

Figure 5:
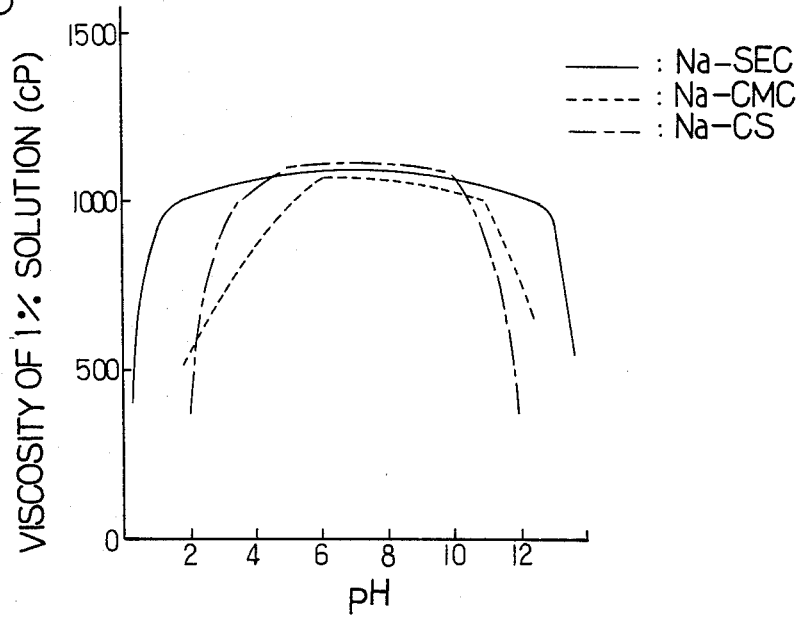
FIG. 5 is a graph showing the relationship between the viscosity and pH of a 1 % by weight aqueous solution of sodium salt of sulfoethylcellolose, cellulose sulfate or carboxymethylcellulose.

As is clear from FIG. 5, Na-CMC is stable in viscosity at pH 6.0 to 11.0, and Na-CS is stable in viscosity at pH 4.5 to 10.0. In other words, viscosity lowering does not occur in these pH ranges, but a remarkable lowering in viscosity is observed outside these ranges. On the other hand, Na-SEC of the invention scarcely show the lowering in viscosity in a pH range of 1 to 13, thus it would be understood that the composition of the present invention has an excellent stability to pH change.

The SEC alkali metal salts having a degree of substitution lower than 0.5. e.g. a degree of substitution of about 0.35, does not show the viscosity lowering due to pH change, but are poor in solubility. Accordingly, the composition contains a large amount of the insoluble Na-SEC in the form of a free fiber which may cause a formation damage. The use of Na-SEC having a low degree of substitution in completion fluids is not desirable.

EXAMPLE 12

In a 10 %, 20 %, 40 % or 60 % $CaBr_2$ aqueous solution containing 3 % of $CaCO_3$ (solid) was dissolved the following polymer in an amount of 2 PPB. The obtained compositions were subjected to the filtration test to measure the water loss.

Figure 6:
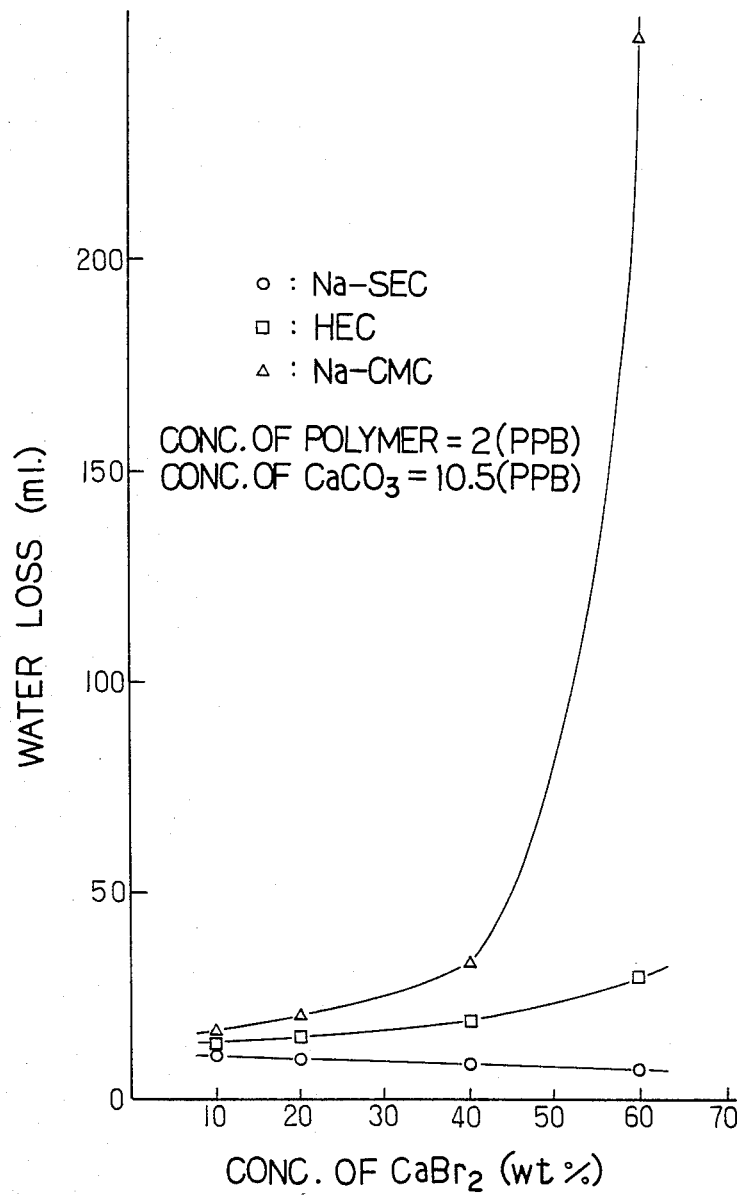
FIG. 6 is a graph showing the results of a filtration test of aqueous solutions containing 3 % by weight of CaCO3 and varied amounts of CaBr2 to which sodium salt of sulfoethylcellulose or carboxymethylcellulose, or hydroxyethylcellulose is added.

Na-SEC of the invention: degree of substitution 1.05, viscosity of 1 % aqueous solution 3,900 cP HEC as comparison: degree of substitution 2.0, viscosity of 1 % aqueous solution 4,500 cP Na-CMC as comparison: degree of substitution 1.00, viscosity of 1 % aqueous solution 4,200 cP The results of the filtration test are shown in FIG. 6.

As is clear from FIG. 6, Na-SEC shows an excellent water loss reducing ability in a wide concentration range of a salt in comparison with HEC and Na-CMC.

EXAMPLE 13

Each of three kinds of polymers, Na-SEC, HEC and Na-CMHEC, shown below was added to 350 ml. of each of a 4 %, 30 %, 60 % or saturated aqueous solution of $CaCl_2$ (commercially available as industrial grade under the commercial name "Peladow" made by Dow Chemical Co.) and a 4 %, 30 %, 60 % or saturated aqueous solution of $ZnBr_2$ in an amount of 4 PPB. The solutions were agitated for 30 minutes at 10,000 r.p.m. by a multi mixer, and after allowing to stand for a night, the increase in volume due to remaining bubbles was measured.

Na-SEC of the invention: degree of substitution 0.50, viscosity of 1 % aqueous solution 3,000 cP Na-CMHEC as comparison: molar substitution of ethylene oxide 1.7, degree of substitution for carboxymethyl group 0.50, viscosity of 1 % aqueous solution 3,150 cP HEC as comparison: molar substitution of ethylene oxide 2.0, viscosity of 1 % aqueous solution 2,900 cP The results are shown in Table 9 wherein the ratio of the volume after agitation to the volume before agitation is shown. The volume after agitation/volume before agitation ratio being 1 indicates that no bubbles generate or even if generate, bubbles immediately disappear. The larger the ratio, the harder the agitation operation in dissolving a polymer.

TABLE 9

| Polymer | Concentration of $CaCl_2$ (%) | | | | | Concentration of $ZnBr_2$ (%) | | | | |
|---|---|---|---|---|---|---|---|---|---|---|
| | 4 | 15 | 30 | 60 | saturation | 4 | 15 | 30 | 60 | saturation |
| Na—SEC | 1 | 1 | 1 | 1.2 | 1.3 | 1 | 1 | 1 | 1 | 1 |
| Na—CMHEC | 1 | 1 | 1.2 | 1.5 | 1.7 | 1.2 | 1.2 | 1.1 | 1 | 1 |
| HEC | 1.2 | 1.2 | 1.3 | 1.5 | 1.8 | 1.5 | 1.3 | 1.1 | 1 | 1 |

As is clear from Table 9, though Na-CMHEC and HEC show a relatively good solubility in the presence of $CaCl_2$ or $ZnBr_2$, they generate large quantities of foams and moreover the foams do not easily disappear. Consequentially, a large quantity of oxygen in the air is incorporated into a completion fluid, whereby corrosion of an equipment due to oxygen is caused or the density of the completion fluid is lowered, and consequently there are brought about difficulties in operation such as increase of danger of well collapse. On the other hand, Na-SEC of the invention scarcely causes foaming in wide concentration ranges of $CaCl_2$ and $ZnBr_2$. Therefore, the composition of the present invention has the superiority that the use of antifoaming agents is not required upon dissolving it in completion fluids.

In addition to the ingredients used in the Examples, other ingredients can be used in the Examples as set forth in the specification to obtain substantially the same results.

What we claim is:

1. A fluid composition for drilling comprising:
   (a) a drilling fluid containing at least one of monovalent and polyvalent salts, and
   (b) an alkali metal salt of sulfoethylcellulose which has a degree of substitution of 0.5 to 2.5 and of which a 1 % by weight aqueous solution has a viscosity of 5 to 5,000 cP.

2. The composition of claim 1, wherein the amount of said alkali metal salt of sulfoethylcellulose (b) is from 0.1 to 1.5 wt/v %.

3. The composition of claim 1, wherein said drilling fluid (a) is a mud.

4. The composition of claim 3, wherein the mud contains a polyvalent salt in a concentration of more than 10,000 p.p.m.

5. The composition of claim 3, wherein the mud contains monovalent and polyvalent salts in a concentration of more than 10,000 p.p.m.

6. The composition of claim 3, wherein the sulfoethylcellulose alkali metal salt (b) is employed in combination with polyethylene glycol having an average molecular weight of 1,000 to 1,000,000.

7. The composition of claim 6, wherein the ratio of the sulfoethylcellulose alkali metal salt to the polyethylene glycol is from 95:5 to 25:75 by weight.

8. The composition of claim 6, wherein the mud contains a polyvalent salt in a concentration of more than 10,000 p.p.m.

9. The composition of claim 6, wherein the mud contains monovalent and polyvalent salts in a concentration of more than 10,000 p.p.m.

10. The composition of claim 1, wherein said drilling fluid (a) is a completion fluid or brine fluid.

* * * * *